United States Patent [19]

Cremeans et al.

[11] 4,335,027

[45] Jun. 15, 1982

[54] AIR-DRIABLE ALKYD RESINS AND PROCESS FOR THEIR PREPARATION

[75] Inventors: George E. Cremeans, Groveport; Richard A. Markle, Columbus, both of Ohio

[73] Assignee: Battelle Development Corporation, Columbus, Ohio

[21] Appl. No.: 257,532

[22] Filed: Apr. 27, 1981

[51] Int. Cl.$^3$ .................. C09D 3/28; C09D 3/58; C09D 3/64

[52] U.S. Cl. .................. 528/281; 260/404.8; 526/273; 528/297; 528/283; 528/295.5; 528/361; 528/366

[58] Field of Search .................. 260/22 EP, 404.8; 526/273; 528/297

[56] References Cited

U.S. PATENT DOCUMENTS

| | | | |
|---|---|---|---|
| 2,108,893 | 2/1938 | Koenig | 260/404.8 |
| 2,940,986 | 6/1960 | Newey | 260/404.8 |
| 2,949,441 | 8/1960 | Newey | 260/404.8 |
| 2,955,101 | 10/1960 | Bruin et al. | 260/404.8 |
| 2,966,479 | 12/1960 | Fischer | 260/404.8 |
| 2,993,920 | 7/1961 | Budde et al. | 260/404.8 |
| 3,050,480 | 8/1962 | Budde | 260/404.8 |
| 3,155,696 | 11/1964 | Findley et al. | 260/404.8 |
| 3,242,196 | 3/1966 | Rheineck et al. | 260/404.8 |
| 3,275,583 | 9/1966 | Kloos | 528/297 |
| 3,376,273 | 4/1968 | Masters et al. | 528/297 |
| 3,546,176 | 12/1970 | Umfreville | 528/297 |

OTHER PUBLICATIONS

Chemical Abstracts, vol. 81, Item 38092s (1974).

*Primary Examiner*—Ronald W. Griffin
*Attorney, Agent, or Firm*—Millard & Cox

[57] ABSTRACT

Air-driable alkyd resins are prepared by reacting substantially equimolar a dicarboxylic acid anhydride and a glycidyl ester of a primary fatty acid, at least part of the ester having a —CH=CH— linkage not α,β to the carboxyl group residue of the fatty acid residue. The glycidyl ester may be used alone or in admixture with a glycidyl ether or epichlorohydrin. Polymerization is effected at relatively low temperatures (100° C. or less) using a catalyst, which is preferably a stannous or zinc carboxylate. The resins produced are substantially color-free and have a narrow range of molecular weights.

26 Claims, No Drawings

AIR-DRIABLE ALKYD RESINS AND PROCESS FOR THEIR PREPARATION

BACKGROUND OF THE INVENTION

This invention relates to air-driable alkyd resins and a process for their preparation.

Air-driable alkyd resins are widely used in paints and similar coating compositions because upon exposure to air the resins form a tough coating which is not easily chipped or broken. The conventional process for producing alkyd resins comprises heating an alcohol containing at least three hydroxyl groups (typically glycerol), monobasic fatty acids and dibasic acids, such as phthalic acid, at high temperatures, typically about 230° to 250° C. Large quantities of energy are consumed in maintaining for several hours the reactant at the elevated temperature required for the reaction in order to drive off the by-product water formed. Moreover, during the protracted heating period, substantial amounts of side-products are formed during the reaction, and these side-products frequently produce an undesirable color in the resin, which may cause difficulty where the resin is intended for use in a white or other light-colored paint. Removal of the side-products and of any color developed is difficult.

The conventional process may also provide a resin having a wide range of molecular weights. This is undesirable since the presence of a wide range of molecular weights of polymerized material causes difficulty in obtaining proper coating characteristics.

The alkyd resin produced by these conventional processes is used with organic solvents with pigments and drying agents to prepare the final paint or other coating material.

There is thus a need for a process for preparing alkyd resins which employs lower temperatures than the conventional process, thereby saving energy and avoiding the formation of colored by-products in the alkyd resin. Furthermore, it is desirable that such a process be completed in a shorter reaction time than the conventional process since this would allow additional energy savings and more efficient use of plant. It is also desirable that such a process produce a resin having a narrower range of molecular weights than the prior art processes. The subject invention provides such a process.

SUMMARY OF THE INVENTION

This invention provides an alkyd resin comprising the polymeric product of the reaction of an anhydride of a dicarboxylic acid and a glycidyl compound. The glycidyl compound may be a glycidyl ester of a primary fatty acid or mixture of primary fatty acids, at least part of the ester having at least two —CH═CH— linkages not α′β to the carboxyl group residue in the fatty acid residue, or a mixture of such a glycidyl ester with a glycidyl ether or epichlorohydrin. The anhydride and the glycidyl compound are reacted at a relatively low temperature, usually not exceeding 100° C. and preferably in the range of 70°–90° C. Typically, the reaction is substantially complete after about 2 to 4 hours.

DETAILED DESCRIPTION OF THE INVENTION

The subject reaction involves opening of both the anhydride and epoxide rings; for example, the reaction between phthalic anhydride and the glycidyl ester of oleic (octadec-9-enoic) acid proceeds as follows:

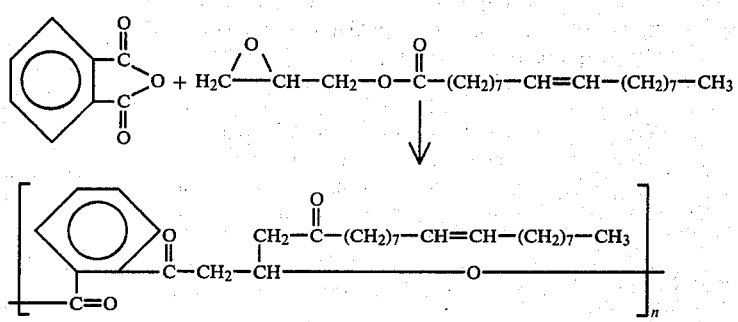

The reaction between the glycidyl compound and the anhydride is an efficient alternating addition reaction. Only very small amounts of carboxyl and/or hydroxyl groups are needed to initiate the reaction and a small amount of a catalyst (described below) enables essentially complete reaction to be achieved at temperatures less than about 100° C. Provided stoichiometric quantities of the reactants are employed, the polymer forming reaction goes essentially to completion, leaving little or no unreacted anhydride or glycidyl groups in the resin product. No by-product water or alcohols are produced in the polymer forming reaction, and thus not only is the product free from unwanted, low molecular weight molecules, but a high efficiency, continuous, closed system reaction procedure may be employed. For example, the subject reaction can be carried out in a heated tubular reactor such as a stainless steel tubular coil provided with means for pumping a liquid mixture of anhydride, glycidyl compound, initiator and catalyst into one end of the tube and the alkyd polymer melt out of the opposed end. Those skilled in the art will be aware that adjustment of the cross-sectional area, surface-to-volume ratio, temperature and throughput rate of such a reactor will ensure the production of a completely polymerized alkyd resin polyester.

The anhydrides used in the subject process may be of those corresponding to the dibasic acids used in the conventional high-temperature methods for the preparation of alkyd resins. Preferred anhydrides are the anhydrides of maleic acid, phthalic acid, tetrahydrophthalic (cyclohex-3-ene-1,2-dicarboxylic) acid, methyltetrahydrophthalic (4-methylcyclohex-3-ene-1,2-dicarboxylic) acid, hexahydrophthalic (cyclohexane-1,2-dicarboxylic) acid and nardic methyl acid. As far as possible, the anhydride should not contain any free acid since such free acid may reduce the molecular weight of the polymer and/or remain as an impurity in the resin.

The glycidyl esters used in the subject process are esters of unsaturated primary carboxylic fatty acids containing at least two —CH=CH— linkages, either alone or in admixture with esters of monomeric and/or saturated fatty acids. The presence of the unsaturated configuration —CH=CH—CH$_2$—CH=CH— is desirable to confer air-drying properties on the alkyd resins produced and it should be noted that, as with alkyd resins produced by prior art processes (see for example, R. F. Fischer, Polyesters from Epoxides and Anhydrides; J. Polymer Sci. 44, 155–172 (1966)), allyl unsaturation (i.e. the presence of an unsaturated linkage $\alpha'\beta$ to the carboxyl group) does not produce an air-driable composition. Thus, the glycidyl ester used in the subject process must not comprise solely an acrylic or substituted acrylic ester, though such esters may be used as a constituent of the glycidyl ester if so desired. Esters of dienoic and trienoic acids are especially preferred. In general, it is preferred to use $C_{12}$-$C_{18}$ fatty acids or mixtures containing such acids. Particularly preferred fatty acids are those derived from soya bean oil (which contains about 0.2% of myristic acid, 7–11% of palmitic acid, 2–5% of stearic acid, about 1% of palmitoleic acid, 22–35% of oleic acid, 50–60% of linoleic acid and 2–10% of linolenic acid) and linseed oil (which comprises approximately 5% of palmitic acid, 3.5% of stearic acid, 5% of oleic acid, 61.5% of linoleic acid and 25% of linolenic acid). Other natural mixtures including unsaturated fatty acids, for example tall oil or tung oil fatty acid, may also be employed, as well as acids from processed oils, for example dehydrated castor oil. These last two mixtures (tung oil and dehydrated castor oil) contain conjugated dienoic and trienoic acids.

The fatty acid glycidyl esters are described in the literature but are not available commercially. However, they may easily be prepared by reacting an alkali metal salt of the appropriate acid (or mixture of acids) with epichlorohydrin. Normally, for economic reasons, the cheap sodium salt (soap) of the fatty acid is employed. The reaction is conveniently carried out in solution in excess epichlorohydrin and most of the alkali metal chloride by-product precipitates out and can be filtered off. Remaining traces of the alkali metal chloride (which would be an undesirable impurity in the final product) may be removed by aqueous washing. The resultant solution of the glydicyl ester in excess epichlorohydrin is treated to remove excess epichlorohydrin, though if desired the product containing some epichlorohydrin may be reacted with the anhydride.

One problem which may be encountered in reacting epichlorohydrin with the alkali metal fatty acid salt to produce the glycidyl ester is that commercial soaps may contain substantial amounts of water and the presence of any substantial amount of water in the alkali metal fatty acid salt greatly reduces the yield of ester so drying of the soaps is desirable. Good yields of ester may be obtained even in the presence of water by using a catalyst a large quantity of quaternary ammonium salt; about 0.1 mole of quaternary ammonium salt is required for each mole of alkali metal fatty acid salt. Commercially-available quaternary ammonium salts are expensive and their recovery from the reaction mixture may present problems. However they may be removed by extensive water washing.

Alternatively, the need for quaternary ammonium catalysts may be eliminated by employing a substantially dry alkali metal fatty acid salt in the reaction with dry epichlorohydrin.

The glycidyl esters described above may be used either alone or in admixture with glycidyl esters and/or epichlorohydrin in the reaction with the anhydride. The esters used may include oligomers resulting from the interaction of two or more glycidyl ester molecules. The alkyl groups of the ethers may be saturated or unsaturated, and the amount and type of unsaturation of the ether used may be varied to effect the degree of unsaturation in the alkyd resin product and consequently the air-drying properties of the resins (see further below). Preferred glycidyl ethers are allyl glycidyl ether, phenyl glycidyl ether and the mixture of heptyl and octyl glycidyl ethers available commercially as "Epoxide No. 7". These preferred glycidyl ethers may be available commercially; and desired ether which is not commercially available may be prepared by conventional methods. For example, the glycidyl ethers may be prepared by the Williamson method by reacting the appropriate sodium alkoxide with epichlorohydrin.

The molecular weights of the alkyd resins produced by the instant polymerization process can be substantially the same as those produced by the prior art processes and the resins are thus suitable for use in paints and other coating compositions. Typically, the air-driable alkyd resins of the invention will have molecular weights of about 1,500 to about 4,000. It is, however, one of the major advantages of the invention that the range of molecular weights in the alkyd resins produced by the subject process is substantially narrower than those produced in conventional high-temperature processes. This permits better control of the properties of the alkyd resins, especially by providing better flow-out and high solids content in coatings applications.

In order that the air-drying properties of the subject alkyd resins may render them useful in paints and similar coating compositions, it is important to control the degree of unsaturation remaining in the alkyd resin after copolymerization. This is achieved by proper choice of the anhydride, glycidyl ester and glycidyl ether (if present) starting materials. Too great a degree of unsaturation in the alkyd resin product may lead to gel formation and a colored product which air dries too rapidly. On the other hand, too small a degree of unsaturation may lead to a product which remains tacky for prolonged periods even in the presence of drying accelerators. The optimum degree of unsaturation for any particular application may be found by those skilled in the art by means of routine experiments, simply by seeing how long a coating composition made from any particular alkyd resin remains tacky. If, for example, the degree of unsaturation of a resin made from anhydride and unsaturated glycidyl ester alone proves to be too great, part of the ester may be replaced with a saturated glycidyl ester or a glycidyl ester of a saturated fatty acid, thereby decreasing the degree of unsaturation. On the other hand, if for example, a resin made from phthalic anhydride proves to have too low a degree of unsaturation, glycidyl esters of fatty acids with more active degrees of unsaturation may be employed and part or all of the phthalic anhydride may be replaced by anhydrides of acids containing active double bonds, for example maleic anhydride, thereby giving additional possible reactive sides. (Although a phenyl nucleus is of course unsaturated, the phenyl nucleus is so stable that it does not take part in cross-linking of the resin during air-drying and is thus effectively saturated so far as cross-linking of alkyd resins is concerned.)

If no catalysts is employed, the reaction takes on the order of 15 hours to proceed to substantial completion. Such a long reaction time is not commercially desirable and also tends to produce an undesirably colored product. In order that the reaction of the anhydride with the glycidyl compound will proceed at a useful rate at the relatively low temperatures employed in the instant invention, a catalyst is necessary. The preferred catalysts are metal salts of carboxylic acids, especially the stannous or zinc salts. Specific preferred catalysts include stannous laurate, stannous octanoate, zinc acetate, zinc stearate and zinc neodecanoate, stannous octanoate and zinc neodecanoate being especially preferred. The use as catalysts of metals which are undesirable in the final alkyd resin (for example, lead) should of course, be avoided. By appropriate choice of metal salt catalysts, the reaction can be made to proceed to substantial completion in not more than 4–5 hours and sometimes less, at about 70°–90° C.

Various other types of catalysts may also be employed, but are usually less satisfactory than metal carboxylic acid salts. Tertiary amines such as N,N-dimethylbenzylamine and N,N-dimethyl-p-toluidine and quaternary ammonium salts such as trioctylpropylammonium chloride and benzyltrimethylammonium chloride tend to produce an objectionable amount of color in the alkyd resin product and also lead to cross-linking and gel formation, especially when maleic anhydride is employed. However, such tertiary amines may be satisfactorily employed when anhydrides having a lower degree of unsaturation than maleic anhydride (for example, phthalic anhydride) are used. For example, reaction of a 50/50 mole ratio phthalic anhydride/maleic anhydride mixture using a tertiary amine catalyst gives a satisfactory product without color formation or cross-linking.

Lewis acid catalysts such as boron trifluoride etherate or boron trifluoride in methanol may also be employed. Such Lewis acid catalysts produce substantially color-free resins, but these resins tend to be of lower molecular weight than those produced with metal carboxylic acid salts. In addition, boron trifluoride catalysts tend to promote some self-reaction of the glycidyl ester to produce polyethers. Moreover, the low molecular weight of the resins produced with boron trifluoride catalysts renders the resin of undesirably low viscosity and some of the resins produced may air-cure slowly or not at all.

Besides the catalysts, it is necessary that a proton source be present in the reaction mixture to act as an initiator. Usually the small amount of initiator needed is present as an impurity, but it may be advantageous to add a specific amount of an initiator. Preferred reaction initiators are glycols, especially ethylene glycol, propylene glycol and neopentyl glycol, about 1–5% by weight of the combined weight of the anhydride and glycidyl compound. In some cases it may also be advantageous to incorporate glycidol (hydroxymethylethylene oxide) into the reaction mixture to react with the anhydride to produce a low molecular weight ester with terminal epoxy and carboxylic acid groups which assist the initiation of the copolymerization. The glycidol may be used as a reactive solvent or cosolvent for the anhydride portion of the reaction mixture.

The presently preferred technique for the copolymerization reaction is bulk polymerization. Bulk polymerization has the advantage of allowing the maximum throughput in any given size of reactor since no diluents need be employed. Moreover, it has been found that the alkyd resins formed by bulk polymerization are readily emulsified in water using a combination of non-ionic and anionic surfactants, this mixture being the same as that used to emulsify alkyd resins produced by prior art processes. Appropriate surfactants include sodium lauryl sulfate, carboxymethylcellulose, hyroxyethylcellulose, poly(vinyl alchohol), poly(acrylamide) and the surfactants sold under the trade names "Uniroyal Polywet", "HLB 12.5", "HLB 14.0" and "Gafac". A more stable emulsion may be obtained by adding toluene to the resin; an amount of about 40% by weight of the resin may be used. Emulsification may be effected by either mechanical agitation in a conventional mill or ultrasonic agitation. The resins may also be solvent cast into films from organic solvents such as toluene.

The drying agents used to promote air-drying of the instant resins are the same as those used to promote drying in conventional alkyd reins, preferred drying agents being cobalt and manganese napthenates. These compounds are used in an amount sufficient to provide 0.05% by weight of metal in the alkyd resin. When toluene is used to promote the emulsification of the alkyd resin, the drying agents are conveniently added in solution in the toluene.

Emulsion polymerization of the anhydride and the glycidyl compound to form the alkyd resin is not at present recommended since the compounds may be hydrolyzed to give products which complicate the polymerization reaction.

The unsaturated resins produced by the subject process may be reacted or blended with modifiers such as cellulose esters, amino resins, rubber derivatives, phenolic resins, rosin products, isocyanates and the like to obtain a wide variety of modified resins with desirable properties.

The following examples of specific processes and resins of the invention are now given, though by way of illustration only.

EXAMPLE I

The sodium soaps of soya fatty acids were prepared by adding an aqueous solution of sodium hydroxide to an acetone solution of the soya fatty acids. The resulting soaps were separated from the reaction mixture of filtration, washed with acetone and dried overnight in a vacuum oven. The glycidyl esters corresponding to these soaps were prepared by reacting the soap product with a 16-fold molar excess of epichlorohydrin under reflux with a quaternary ammonium salt catalyst. Water was added to the reaction mixture to dissolve the sodium chloride formed, the water layer separated from the organic layer and the organic layer washed with water. The excess epichlorohydrin was distilled from the washed organic layer by distillation under reduced pressure. The remaining glycidyl ester of soya fatty acids was further treated to remove remaining epichlorohydrin and water.

The glycidyl ester thus prepared as polymerized with maleic anhydride without the addition of any solvent. Stannous octanoate was used as catalyst in an amount of 0.2 mole percent based upon the glycidyl ester. The reaction was conducted at 90° C. and was substantially complete after four to five hours. A similar run was made at 70° C. The resulting alkyd resin was only slightly colored and gel permeation chromatography in tetrahydrofuran using polypropylene glycol standards showed an average molecular weight of 3,500.

The alkyd resin produced was solvent cast from toluene. In separate trials 0.05% by weight (weight of metal based on weight of alkyd resin) of cobalt, lead and manganese naphthenate drying agents were added dissolved in the toluene. Thin, clear, substantially colorless films were cast from the emulsified alkyd resin/toluene mixture; after air-drying for about 4 hours, these films were tough, non-tacky and resistant to fingernail scratching.

The experiment was repeated using boron trifluoride etherate in place of the stannous octanoate catalyst. An almost colorless alkyd resin was obtained of lower molecular weight than that obtained with stannous octanoate, and the resin air-dried slowly when mixed with the aforementioned naphthenate drying agents.

Repetition of the experiment with various tertiary amine and quaternary ammonium salts produced highly colored, cross-linked products containing substantial amounts of gel. The colors of these resins were too dark for them to be satisfactory in white or other light-colored paint.

EXAMPLE II

This example illustrates the effect of replacing part of the maleic anhydride used in Example I with phthalic anhydride.

The glycidyl ester of soya fatty acids was prepared in the same manner as in Example I. This glycidyl ester of soya fatty acids was then copolymerized using the same catalysts and conditions as in Example I, but substituting a 50/50 mole ratio mixture of phthalic anhydride and maleic anhydride for the pure maleic anhydride used in Example I. The alkyd resin produced was colorless and had a weight average molecular weight, as determined by gel permeation chromatography, of 2150. After the copolymerization, a small amount of solid residue remained; analysis showed this to be phthalic acid.

The resultant alkyd resins were formed into clear films in the same manner as in Example I. These films were not as tough as those made using maleic anhydride alone and after overnight drying were still slightly tacky and easily marred with a fingernail scratch.

EXAMPLE III

The glycidyl ester of soya fatty acids was prepared in the same manner as in Example I. An equimolar mixture of the glycidyl ester and phenyl glycidyl ether was then reacted with an equal number of moles of methyltetrahydrophthalic anhydride using 0.2 mole percent (based upon the ester/ether mixture) of zinc neodecanoate as a catalyst. The reaction was effected in bulk at 75° C. and was substantially complete after two hours. The weight average molecular weight of the colorless alkyd resin produced, as determined by gel permeation chromatography, was 2752.

Films were produced from the resin as in Example I. Films were also formed from emulsified alkyd resin with the addition of drying agents. The films did not air-dry at a rate sufficiently great to allow the resins to be used in commercial paints or other coating compositions, the films still being tacky after 48 hours. It is believed that the very slow air-drying of the films is due to the use of the saturated phenyl glycidyl ether in combination with the soya fatty acid ester.

EXAMPLE IV

This example illustrates the preparation of an alkyd resin from the glycidyl ester of linseed fatty acids and maleic anhydride using zinc neodecanoate as catalyst.

1.71 Equivalents of linseed oil fatty acids ("Groco 20" obtained from A Gross and Co., Newark, N.J.) was dissolved in 1.5 l. of acetone in a 3-liter round bottom resin kettle equipped with a paddle stirrer and an argon purge and a stoichiometric quantity (0.5 l.) of 5.67 N aqueous sodium hydroxide solution was added thereto from a dropping funnel. Most of the acetone was removed from the resulting linseed soap by vacuum suction filtration using a medium fritted-disc filter funnel. The soap was transferred to a Pyrex baking dish and residual water removed using a vacuum oven at 21° C. and 2 mm. Hg. pressure for 15 hours. The resulting dry soap was ground to coarse granules using a mortar and pestle.

450 g (1.45 equivalents) of the ground linseed soap thus produced was replaced in the aforementioned resin kettle which was equipped with a paddle stirrer, an argon purge, a thermocouple having a digital read-out and a Dean-Stark receiver having a condensor. A 16-fold excess plus an extra 45 ml. of epichlorohydrin, was added to the kettle. The resulting dispersion of the soap in the epichlorohydrin was heated to 116°–119° C. using an external oil bath in a heating mantle on a scissor jack and 45 ml. of epichlorohydrin distilled over into the receiver; this epichlorohydrin azeotropically removed the remaining traces of water from the soap. The temperature within the kettle was lowered to 90° C. by lowering the oil bath and pouring oil at room temperature over the outside of the kettle. 26.93 g. (0.145 moles) of dry anhydrous benzyl trimethylammonium chloride was added to the soap dispersion by means of a funnel to act as catalyst and the kettle resealed. The mixture was then refluxed for one hour at 116°–119° C., the temperature within the kettle lowered to 90° C. in the same manner as before, and 1 l. of distilled water was added, thereby lowering the temperature of the mixture within the kettle to about 52° C. The kettle contents were stirred for 20 minutes and then transferred quantitatively to a 4 l. separatory funnel and allowed to stand for 30 minutes, after which the aqueous phase was run out of the separatory funnel and the organic phase returned to the kettle. A further 1 l. of distilled water was added to the kettle, and the contents were stirred for 20 minutes, quantitatively transferred to the aforementioned separatory funnel and allowed to stand overnight (about 10 hours). The aqueous phase was run out of the funnel and the organic phase again returned to the kettle. These two aqueous washings served to remove the sodium chloride produced during the reaction of the linseed soap with the epichlorohydrin and the quaternary ammonium catalyst.

A distilling head and 2 l. round bottom flask receiver were attached to the kettle and the excess epichlorohydrin removed by vacuum distillation at 70° C. and 1 mm. Hg. pressure until no further distillate could be collected. To remove the last traces of epichlorohydrin, two 1 l. aliquots of dry toluene were successively added to the kettle and distilled off at 70° C. and 1 mm. Hg. pressure.

The product was confirmed to be the glycidyl ester of linseed fatty acids by its infrared spectrum (broad ester band at about 3,000 cm.$^{-1}$). The yield was 504 g. (99.6% of theoretical based upon the linseed fatty acids used). Gas chromatography showed not more than 100 p.p.m. of epichlorohydrin in the product.

A 50 g. aliquot of the product was purged overnight using argon and transferred to a three-necked 1 l. reaction flask equipped with a paddle stirrer, argon purge and a thermocouple connected to a strip chart recorder. The flask was suspended in an external heating bath having a thermocouple connected to the same recorder. A stoichiometric amount of 14.1 g.) of maleic anhydride dried overnight in a vacuum oven was added to the flask and the temperature of the bath was raised to 75° C. until the temperature of the stirred reaction mixture reached 70° C. Zinc neodecanoate catalyst in an amount of 1.3 g. (2% of the combined weight of the glycidyl ester and the anhydride) was added to the reaction mixture. The bath was maintained at 75° C. for one hour, the temperature of the reaction mixture was lowered and the products removed from the flask. Despite the relatively large amount of catalyst, used no substantial exotherm was observed during the reaction.

Analysis of the alkyd resin formed by gel permeation chromatography indicated a weight average molecular weight of about 3,000.

Films were solvent cast from the resin by dissolving 0.5 g. of the resin in a mixture of 0–5 ml. of toluene and 0.5 ml. of methylene chloride and adding 0.1 ml. of cobalt, lead or manganese naphthenate as driers. The films were cast on precleaned microscope slides using a thin artist's brush and tested periodically for tackiness by finger touch. Control films were also cast without driers.

In a first set of tests using each of the three driers, thin, clear, colorless films were obtained. After one hour's exposure to air, all the films were still tacky, but after 44 hours exposure all the films (including one prepared without drier) were cured and were resistant to fingernail impression, fingernail scratching and a light toluene wipe.

In a second series of tests, films were prepared using cobalt and manganese naphthenate driers and without drier. After 4 hours, only the cobalt film had cured and was tough, non-tacky and not marred by fingernail scratching. After 24 hours the other films had cured.

EXAMPLE V

Example III was repeated substituting an equimolar mixture of nadic methyl anhydride and maleic anhydride for the methyltetrahydrophthalic anhydride of Example III. The same catalyst and reaction conditions were used and a colorless alkyd resin of about the same average molecular weight as in Example III was obtained. Colorless films were cast from resin emulsified both with and without toluene as in Example III. These films air-dried in a few hours to form a tough film.

It will be apparent to those skilled in the art that numerous changes and modifications may be made to the resins and processes described above without departing from the scope of the invention. Accordingly, the foregoing description is to be interpreted in an illustrative and not in a limitative sense, the scope of the invention being defined solely by the appended claims.

We claim:

1. A process for preparing an air-driable alkyd resin which comprises polymerizing an anhydride of a dicarboxylic acid with a glycidyl compound selected from the group comprising glycidyl esters of primary fatty acids, at least part of said esters having at least two —CH=CH— linkages in the fatty acid residue thereof not $\alpha',\beta$ to the carboxyl group residue, mixtures of said glycidyl ester and glycidyl ether, and mixtures of said glycidyl ester and epichlorohydrin.

2. A process according to claim 1 wherein said polymerization is effected at a temperature not exceeding about 100° C.

3. A process according to claim 2 wherein said polymerization is effected at a temperature of about 70° to about 90° C.

4. A process according to claim 1 wherein said polymerization is effected in the presence of a catalyst comprising a metal salt of a carboxylic acid.

5. A process according to claim 4 wherein said metal salt is a stannous or zinc salt.

6. A process according to claim 5 wherein said metal salt is stannous laurate, stannous octanoate, zinc acetate, zinc stearate or zinc neodecanoate.

7. A process according to claim 1 wherein said anhydride is phthalic anhydride, methyltetrahydrophthalic anhydride, hexahydrophthalic anhydride, nadic methyl anhydride or maleic anhydride.

8. A process according to claim 1 wherein at least part of said glycidyl ester is derived from a fatty acid containing a grouping of the formula —CH=CH—CH$_2$—CH=CH—.

9. A process according to claim 8 wherein said glycidyl ester is the glycidyl ester of soya fatty acids or the glycidyl ester of linseed fatty acids.

10. A process according to claim 8 wherein said glycidyl ester is the glycidyl ester of tall oil fatty acids.

11. A process according to claim 1 wherein at least part of said glycidyl ester is derived from a conjugated dienoic or trienoic fatty acid.

12. A process according to claim 11 wherein said glydicyl ester is the glycidyl ester of tung oil fatty acids or dehydrated castor oil fatty acids.

13. A process according to claim 1 wherein said glycidyl ether is allyl glycidyl ether, phenyl glycidyl ether or a mixture of heptyl and octyl glycidyl ether.

14. A process according to claim 1 wherein said polymerization is effected by bulk polymerization.

15. A process according to claim 6 wherein said anhydride is methyltetrahydrophthalic anhydride, said glycidyl compound comprises a mixture of the glycidyl ester of soya fatty acid and phenyl glycidyl ether and said catalyst is zinc neodecanoate.

16. A process according to claim 6 wherein said anhydride is maleic anhydride, said glycidyl compound is the glycidyl ester of soya fatty acid and said catalyst is stannous octanoate.

17. A process according to claim 6 wherein said anhydride is maleic anhydride, said glycidyl compound is the glycidyl ester of linseed fatty acid and said catalyst is zinc neodecanoate.

18. A process according to claim 1 wherein said glycidyl ester is prepared by reacting epichlorohydrin with an alkali metal salt of said fatty acid.

19. A process according to claim 1 wherein a reaction initiator is added to the reaction mixture.

20. A process according to claim 19 wherein said reaction initiator is a glycol.

21. A process according to claim 20 wherein said glycol is ethylene glycol, propylene glycol or neopentyl glycol.

22. A process according to claim 20 wherein said glycol is added in an amount of from about 1 to about 5% of the combined weight of the anhydride and the glycidyl compound.

23. An air-driable alkyd resin comprising the reaction product of an anhydride of a dicarboxylic acid and a glycidyl compound selected from the group comprising glycidyl esters of primary fatty acids, at least part of said esters having at least two —CH=CH— linkages in the fatty acid residue thereof not $\alpha'\beta$ to the carboxyl group residue, mixtures of said glycidyl esters and glycidyl ethers, and mixtures of said glycidyl esters and epichlorohydrin.

24. A resin according to claim 23 wherein at least part of said glycidyl ester is derived from a fatty acid containing a grouping of the formula —CH=CH—CH$_2$—CH=CH—.

25. A resin according to claim 24 wherein said glycidyl ester is derived from soya fatty acids or linseed fatty acids.

26. A resin according to claim 23 wherein at least part of said glycidyl ester is derived from a conjugated dienoic or trienoic acid.

* * * * *